Patented June 23, 1931

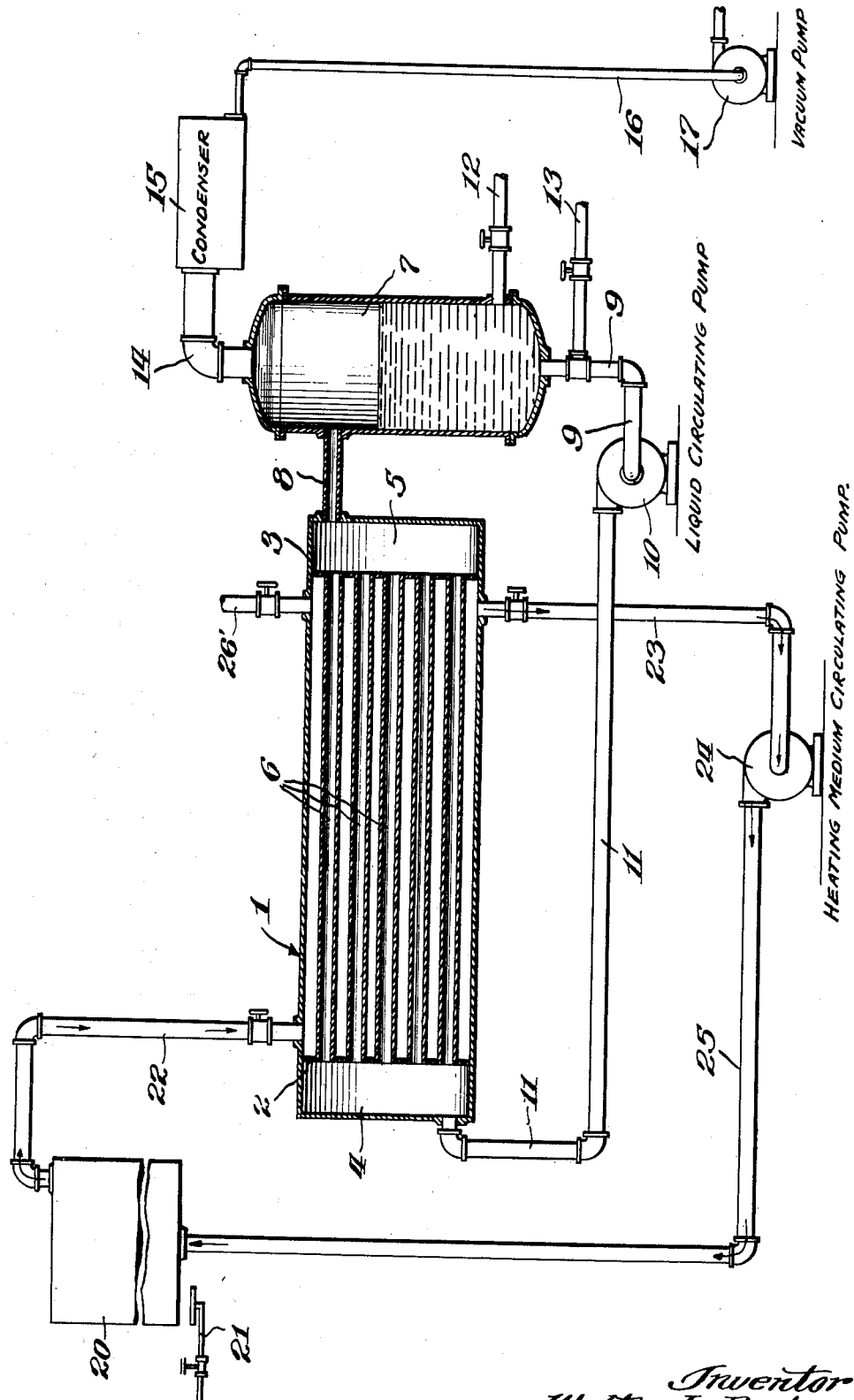

1,811,290

UNITED STATES PATENT OFFICE

WALTER L. BADGER, OF ANN ARBOR, MICHIGAN, ASSIGNOR TO SWENSON EVAPORATOR COMPANY, OF HARVEY, ILLINOIS, A CORPORATION OF ILLINOIS

POLYMERIZATION OF DRYING OILS

Application filed August 16, 1928. Serial No. 299,958.

My invention relates to the polymerization of drying oils,—particularly of linseed and Chinawood oils for use in varnishes, printers' inks, and the like.

The term "drying oil" is used in the art to designate those oils (usually vegetable) employed in the manufacture of paints, varnishes, japans, printer's inks and the like to serve as the vehicle whereby the pigments or gums are applied to the surfaces to be covered and, by a process of oxidation rather than evaporation, form with the pigment or gum a hard covering surface that is stable under ordinary conditions.

The term polymerized, or as it is commonly termed, "boiled" or "bodied" oil is employed in the sense in which it is now generally used in the art, viz, to described oils whose mean molecular weight, specific gravity and viscosity have been increased by application of heat. As now generally used in the art, polymerization embraces not only the increase of mean molecular weight by the combination of unsaturated molecules, but also the accompanying and perhaps almost equally desirable driving off of the more volatile constituents.

The polymerization of oils is a very old art but, as heretofore practiced, is a long, expensive, and uncertain process. Two methods of polymerization have been in vogue for many years,—each necessitating the treatment of the oil in kettles in relatively small individual quantities or "batches",—around one hundred gallons each being a common quantity for a batch. In the practice of one method, generally known as the "burning" process, the principal source of the heat required to drive off the more volatile constituents is derived by firing the surface of the oil itself,—the burning of a part of a batch of oil providing the heat necessary for the polymerization of the rest of the batch. In the practice of the other method, generally termed the "boiling" process, the necessary heat is derived from the burning of a coal, gas, or coke fire beneath the kettle containing the oils.

As far as I am aware there has heretofore been no satisfactory substitute for the foregoing methods, although both are open to numerous and serious objections. The degree of polymerization is largely dependent upon the temperature and from the very nature of the "burning" or "boiling" processes, anything like close temperature regulation is well nigh impossible. In order even to roughly approximate a uniform distribution of heat throughout a batch and to prevent overheating—at the surface with the "burning" process and adjacent the kettle walls with the "boiling" process—it has been necessary to stir the contents of the kettles by hand methods. Overheating produces an oil of poor quality and color,—a condition particularly objectionable in varnish oils. And with Chinawood oil overheating is especially objectionable as this oil is apt to become relatively solid if heated above its critical temperature. The proper polymerizing temperatures are ordinarily determined or judged largely, if not entirely, by the individual skill and judgment of the operators, requiring long experience before even a moderate degree of proficiency can be attained and, of necessity, leading to considerable variation even in batches treated by or under the supervision of the same individual. Because of the inherent variation between batches it is the common practice to mix the products from particular kettles, but even this expedient does not eliminate differences of quality that are productive of uncertain and sometimes unsatisfactory results. The close attention required by the necessity for constant observation and stirring and the physical effort of the latter are sources of great hazard and fatigue. The heating of the oil in open kettles results in objectionable oxidation and introduces a serious fire hazard. Furthermore, the space required and the investment for equipment and facilities necessary for a large plant are excessive.

One of the objects of my invention is to provide an improved process for polymerizing oils.

Another object is to provide a process whereby oils may be polymerized continuously.

Another object is to provide a process that will produce a polymerized oil of improved and uniform quality.

A further object is to provide a process that will afford dependable and immediate temperature control.

Another object is to reduce, if not entirely eliminate the human and fire hazards and the objectionable oxidation inherent in past methods.

Another object is to provide a process that is simple, reliable, and effective and will not require prohibitively expensive apparatus.

Another object is to provide apparatus suitable to the practice of my improved process.

Other objects and advantages will hereinafter appear.

The accompanying drawing illustrates, largely in a diagrammatic manner, a form of apparatus by which the process may be practiced.

The apparatus includes a heater 1, preferably of the tubular type where heat from a suitable heating medium is transferred to the oil to be polymerized. This heater comprises a suitable sheet metal body provided with tube sheets 2 and 3 spaced sufficiently from opposite ends of the body to provide headers or distribution chambers 4 and 5 respectively. A series of metal tubes 6 preferably relatively long and of small diameter extend between and through tube sheets 2 and 3 being tightly joined thereto in any approved manner such as welded or expanded and riveted.

Header 5 is connected to a vessel 7 by a pipe 8 while header 4 is connected to the lower end of vessel 7 through a pipe 9, a liquid circulating pump 10 and a pipe 11. The oil being polymerized is circulated at high velocity from vessel 7 through the tubes of heater 1 back to vessel 7. The oil after being polymerized may be withdrawn from vessel 7 through an oil outlet 12 and oil to be polymerized may be injected into the system through an inlet 13.

The volatile constituents that are driven from the oil at polymerizing temperatures escape from vessel 7 through a vapor outlet pipe 14. Such vapors may be permitted to escape directly to atmosphere, although I prefer to effect vaporization under a partial vacuum. By the use of a suitable partial vacuum vaporization can be carried on more expeditiously. Where a partial vacuum is employed vapor outlet 14 is led to a suitable condenser 15, where the condensable vapors are reduced and from which the non-condensable gases are withdrawn through a vacuum pipe 16 to maintain the desired degree of reduced pressure. A vacuum pump 17 is used to remove the non-condensable gases and, since the volume of such gases is ordinarily only a small part of the total volume removed from vessel 7, the capacity of the vacuum pump may be small.

The proper temperatures for the polymerization of linseed and Chinawood oils at one atmosphere pressure is between 500 degrees F. and 600 degrees F.; probably close to 550 degrees F. is about the best temperature for commercial conditions as there is no danger of overheating and polymerization takes place in a few minutes at that temperature. Thus it is desirable to impart heat rapidly at approximately this or equivalent temperatures to the circulating oil. The heating medium that I prefer to employ to heat the rapidly moving streams of oil flowing through the tubes of heater 1 is a suitably heated saturated vapor of a non-metallic substance that is stable at temperatures sufficiently above 550 degrees F. to insure proper heating of the oil and with a saturation pressure at the temperatures involved that is feasible for confinement in ordinary present-day steel equipment. Diphenyl or diphenyl oxide are such substances. Their boiling points are around 500 degrees F. at a pressure of one atmosphere and at temperatures well above those required for the polymerization of linseed or Chinawood oils the saturated vapor pressures are well within the range of safe and every day boiler construction, i. e., below 200 to 250 pounds gauge. Both substances are stable at the desired temperatures, and particularly diphenyl is inactive on ordinary metals. The relatively high density of their vapors as compared to saturated steam renders it possible to use a smaller volume, even though their latent heats are considerably less than that of steam.

The heating medium is vaporized and heated to the desired temperature in a boiler 20, that is heated in any suitable manner, such as by a gas burner 21. The heated vapor is conducted to the chamber of heater 1 about the tubes through a pipe 22 and the liquid formed by its condensation is removed through a pipe 23 and returned to the boiler by a pump 24 through a return pipe 25. Noncondensable gases may be liberated from the heating chamber of heater 1 through a suitable vent 26.

Pumps 10, 17, and 24 may be of any approved and suitable type, driven by appropriate means such as electric motors.

In operation on a continuous process basis the oil to be polymerized is rapidly circulated from vessel 7 through heater 1 and back to vessel 7 and the vaporized heating medium whose temperature has been raised in boiler 20 is rapidly circulated about the oil filled tubes of heater 1. Thus the heat is continuously and rapidly applied to the oil. Raw oil is continuously fed to the apparatus through inlet 13 and polymerized oil is withdrawn through outlet 12. The rates of feed and discharge may be so controlled and proportioned to the total volume of oil in the apparatus that all of the oil introduced will be subjected to the necessary heat for a sufficient length of time to be polymerized before it escapes.

Under conditions rendering a "batch" treatment to be preferred to a continuous process the apparatus may be so operated by introducing a sufficient quantity of oil to properly fill the apparatus and then, with valves 12 and 13 both closed, rapidly circulating and heating that fixed quantity until the desired degree of polymerization is effected.

In the manufacture of printing inks the proper coloring pigments and in the manufacture of gum varnishes, the proper gums may be added in the usual way after the oil has been polymerized. However, in the manufacture of varnishes consisting of polymerized Chinawood oil and rosin the rosin may be added to the oil before polymerization. In such case the oil may be warmed and melted rosin added in the proper proportions and then this mixture passed through the apparatus to polymerize the oil. Such a practice is perfectly feasible because the melted rosin is soluble in the hot Chinawood oil, the presence of the rosin does not materially affect the rate of polymerization of the oil and the temperature at which the oil may be polymerized does not seriously affect the rosin. Furthermore, the inclusion of the melted rosin in the Chinawood oil before polymerization, slows down the action somewhat and makes proper control an easier matter. Practice of the process in this manner results in finished varnish stock, which may be withdrawn through pipe 12. Of course other mixtures than that of Chinawood oil and rosin may be similarly treated if the oil and other ingredients react in a like manner.

The temperature of the oil may be almost instantly varied by varying the pressure of the heating vapor and by changing the pressure in vessel 7 so that a close degree of temperature regulation is possible.

The use of heating media other than those of the character I have heretofore proposed, such as saturated steam, superheated steam, flue gases, or hot liquids present such serious difficulties, at least under present day conditions, that I do not consider them feasible for utilization in my process. Thus, saturated steam, although it might provide the necessary rapidity of heat transfer, would involve pressures so high as to be prohibitive in cost and hazard with present day facilities and engineering practice; superheated steam in addition to affording a rate of heat transfer too low to accomplish the desired results would necessitate the handling of such large volumes of vapor as to make its use prohibitive and the temperature drop accompanying the transfer of heat from superheated steam would render this medium unsatisfactory; flue gases have a rate of heat transfer to metal so low that excessive temperatures would be required and the temperatures of flue gases can not be readily controlled; and such liquids as are now available decompose at the temperatures required.

Having thus illustrated and explained the nature and an embodiment of my invention, what I claim and desire to secure by Letters Patent of the United States is as follows:

1. The method of polymerizing drying oils that comprises circulating the oil at a rapid rate from a vessel under reduced pressure through a heater and back to the vessel, and rapidly imparting heat to the oil as it passes through the heater.

2. The method of polymerizing drying oils which comprises passing the oil at a rapid rate through a heater and indirectly heating it with the saturated vapor of a substance having under the pressures employed a boiling point which is approximately the polymerization temperature of the drying oil.

3. The method of polymerizing oils which comprises passing the oil through a heater and indirectly heating it with saturated diphenyl vapor.

4. The method of polymerizing oils which comprises passing the oil through a heater and indirectly heating it with saturated diphenyl oxide vapor.

In witness whereof, I hereunto subscribe my name this 9th day of August, 1928.

WALTER L. BADGER.